United States Patent [19]
VanderMeer et al.

[11] 3,918,598

[45] Nov. 11, 1975

[54] METHOD FOR POSITIONING AND ORIENTING PALLETIZED ARTICLES

[75] Inventors: Richard H. VanderMeer, Golden; Robert L. Simmons, Lafayette, both of Colo.

[73] Assignee: Goldco, Industries Inc., Golden, Colo.

[22] Filed: Jan. 9, 1975

[21] Appl. No.: 539,660

Related U.S. Application Data
[62] Division of Ser. No. 390,639, Aug. 22, 1973.

[52] U.S. Cl. ................. 214/152; 214/6 M; 214/6 N
[51] Int. Cl.² ........................................ B65G 57/24
[58] Field of Search ............ 214/6 P, 6 S, 6 N, 6 M, 214/6 H, 152; 198/235

[56] References Cited
UNITED STATES PATENTS

| | | | |
|---|---|---|---|
| 2,602,554 | 7/1952 | Griffith | 214/6 S |
| 2,946,465 | 7/1960 | Raynor | 214/6 H |
| 2,949,179 | 8/1960 | Busse | 214/6 H |
| 3,111,233 | 11/1963 | Raynor | 214/6 S |
| 3,219,203 | 11/1965 | Jeremiah | 214/6 H |
| 3,430,784 | 3/1969 | Hall | 214/6 H |
| 3,612,300 | 10/1971 | Berghgracht | 214/6 H |
| 3,664,087 | 5/1972 | Choate et al. | 214/6 H |

*Primary Examiner*—Robert J. Spar
*Assistant Examiner*—Leslie J. Paperner
*Attorney, Agent, or Firm*—Thomas W. O'Rourke

[57] ABSTRACT

Palletized articles are formed in tiers having edges set back from the edges of the supporting pallet or separator sheet by transporting a number of articles into a positioning area defined on three sides by positioning guides to form the articles into an appropriately dimensioned tier, lowering the tier and retracting the positioning means to permit placement of the separator sheet on top of the tier, and repositioning of the positioning means with concurrent proper positioning of the separator sheet and a final orientation of the lowered tier from four sides, the device for accomplishing the positioning and orientation being articulated in the lower, orienting portion to accommodate the situation in which the initial tier is placed directly on a pallet and the pallet occupies the lower position being of a dimension substantially larger than that of the lower tier.

4 Claims, 7 Drawing Figures

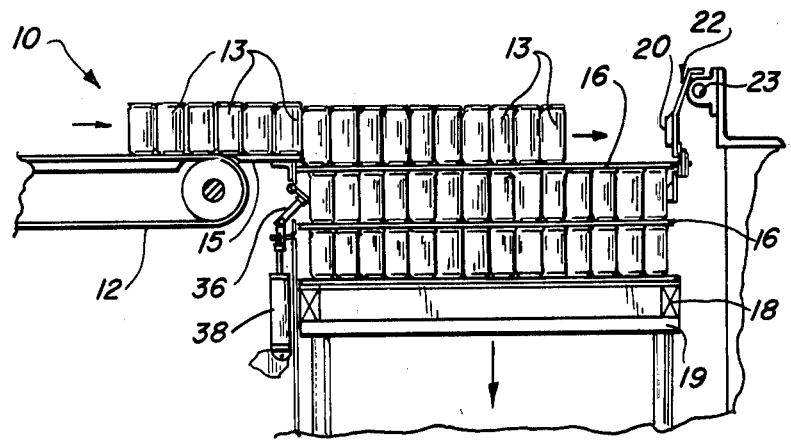
Fig_1
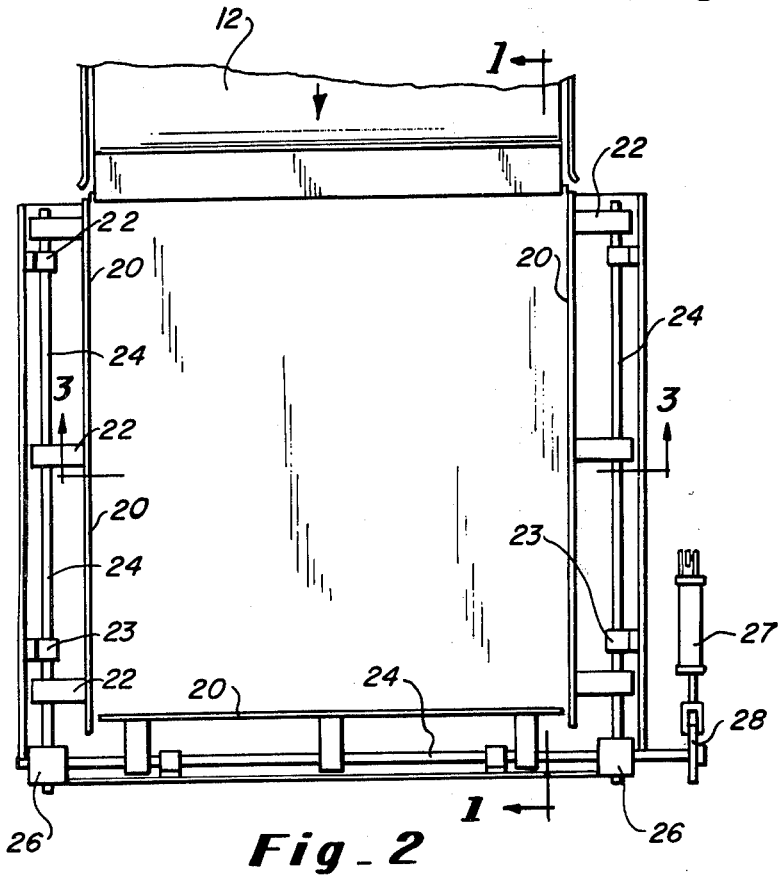
Fig_2

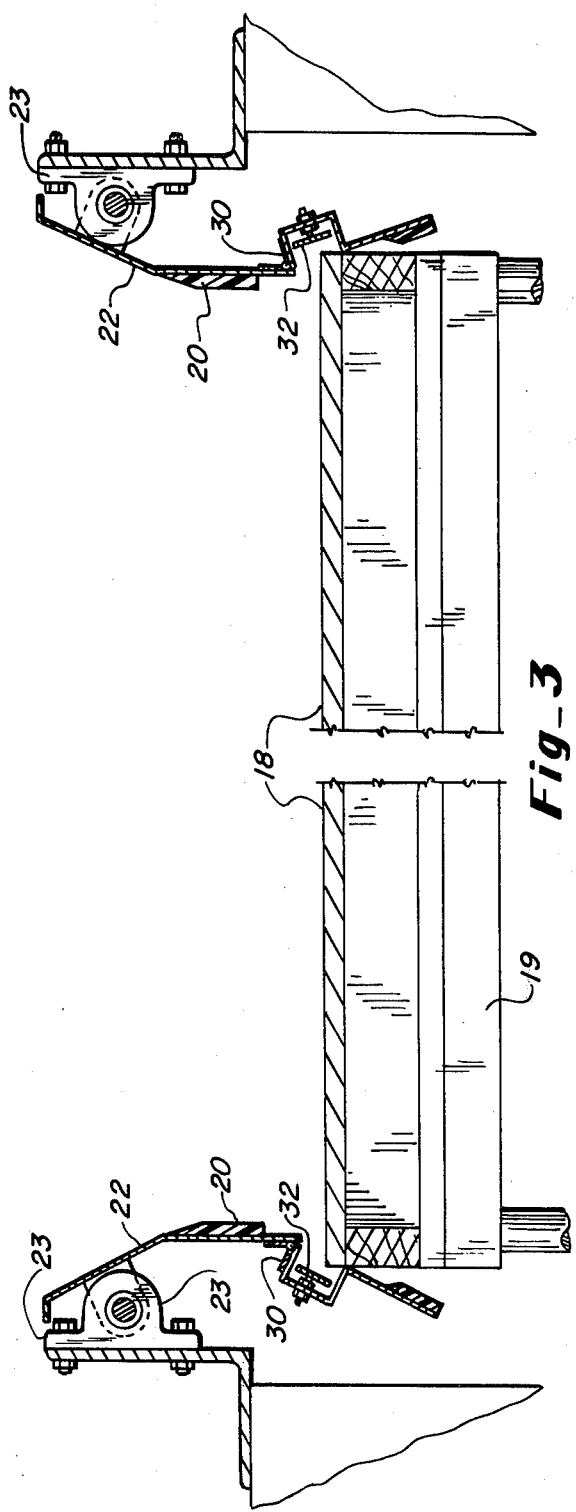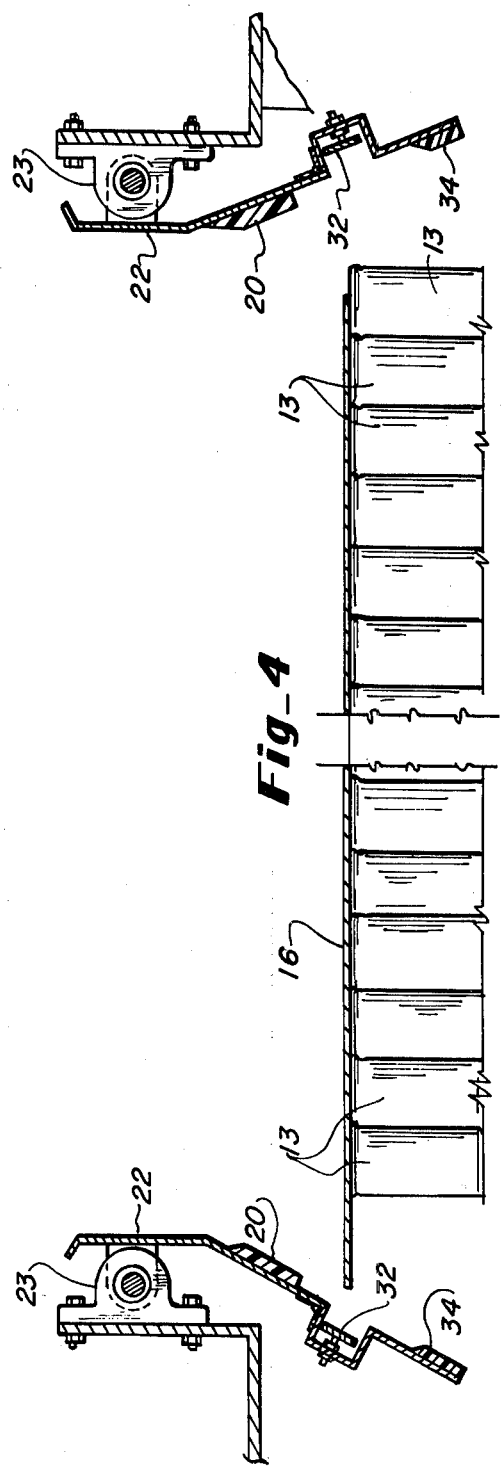

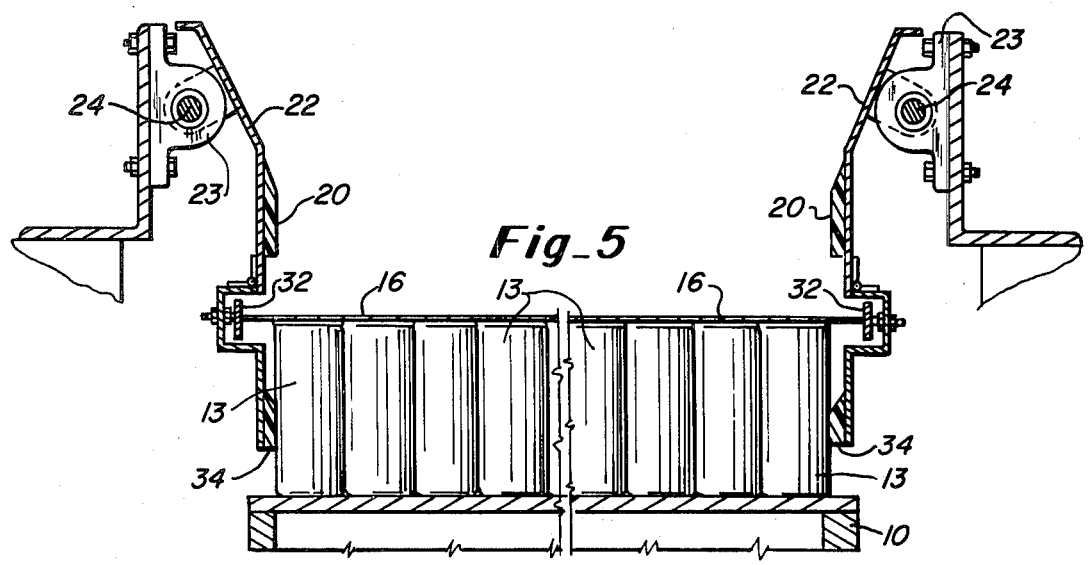
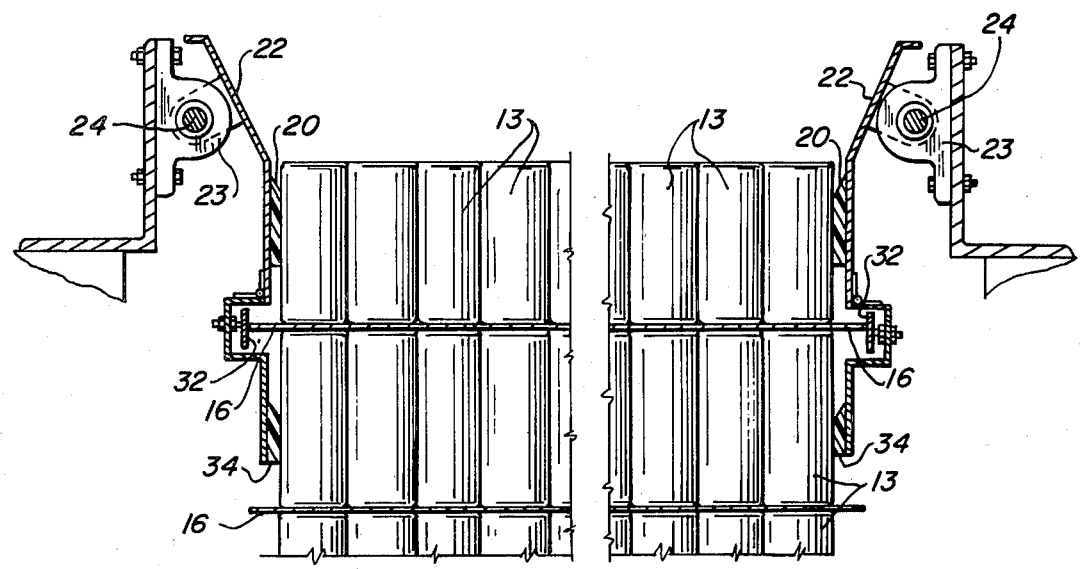
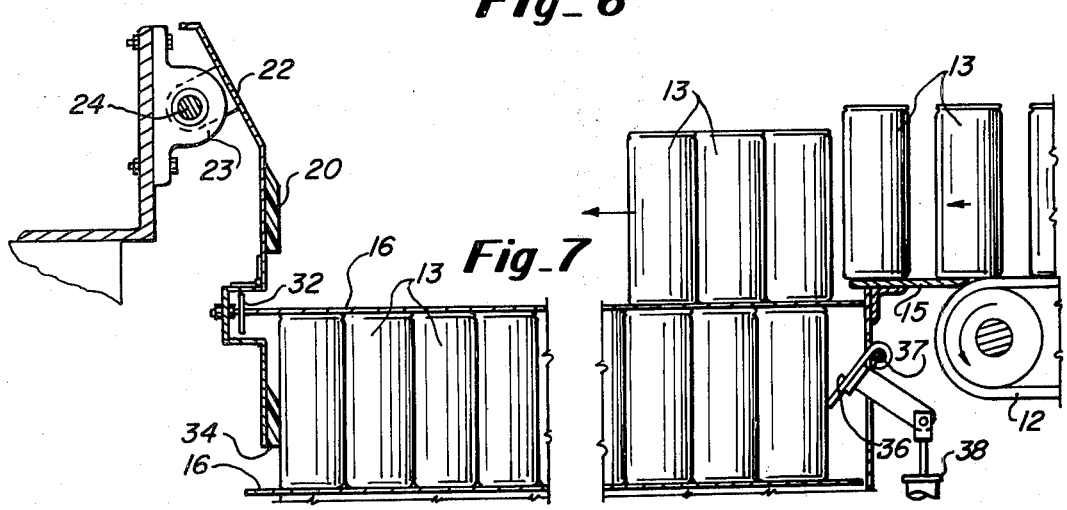

METHOD FOR POSITIONING AND ORIENTING PALLETIZED ARTICLES

BACKGROUND OF THE INVENTION

This application is a division of application Ser. No. 390,639, filed Aug. 22, 1973.

FIELD OF THE INVENTION

The present invention relates generally to palletizing of articles, such as containers, into a tiered, palletized load, and, more particularly, to a method for initially positioning the articles as they are transported onto the pallet or separator sheets into tiers set back substantially from the edges of the separator sheets or pallets, and providing for final orientation of the articles relative to the palletized load after the disruptive steps of lowering of the load after formation and placement of the separator sheet have been completed, and immediately prior to the imposition of a load onto the separator sheet above the tier being oriented. Further, the method provides for placement and location of a separator sheet when the tiers are spaced from the edge of the separator sheet.

DESCRIPTION OF THE PRIOR ART

Large number of articles are conventionally palletized in a rapid and mechanized manner by conveying the articles onto a pallet until the pallet is substantially filled with the articles—thereby forming a tier—lowering the pallet approximately the height of the article, interposing a separator sheet and conveying additional articles onto the separator sheet to form another tier of articles. The operation is repeated until a multitiered load is formed. Such palletization is quite common with regard to containers such as glassware or cans. The patterns of tiers are carefully predetermined for the purpose of economical utilization of space and for proper interfacing with subsequent operations. It is not unusual for such palletized loads to extend 10 or 15 feet in height. Accordingly, it is most important that each tier be properly positioned and oriented both in relationship to other tiers and to the pallet.

Conventionally, articles have been placed closely adjacent the edge of the pallet or separator sheet. With the edges of the pallet, separator sheets and tiers substantially in a vertical plane, fixed vertical walls were conventionally used to form and locate the palletized load. It was a simple matter to align the edge of the pallet, the separator sheet and the tiers.

However, the rather fragile nature of certain palletized articles, such as drawn and wall-ironed cans, has developed a demand for pallet load arrangements in which the articles are spaced a substantial distance from the outer edge of the pallet or separator sheets to provide a measure of protection to the articles. In addition, with the separator sheet protruding from the edge of the palletized load, it is a much simpler matter to mechanically grasp and remove the separator sheet from the tier when depalletizing or performing some other operation.

Other than the not particularly successful use of horizontally-mounted hydraulic or pneumatic cylinders, in conjunction with fixed vertical walls, to urge guides against the periphery of a lower tier on three sides thereof, there is little prior art as to equipment for guiding, locating and orienting unconventional arrangements wherein the edge of the tier is spaced back from the outer edge of the separator sheets or pallet. Such prior art means as are known are inflexible with regard to alignment of a given tier with regard to a previously formed tier, in providing for insertion of or locating of the separator sheet, or in coping with the situation where the initial load is formed upon the pallet and the pallet occupies the space normally occupied by the lower tier. In addition, with only three sides of the tier usually being aligned, and with any inaccuracy of alignment being accommodated on the fourth side, the overall performance of the prior art attempts to locate and orient palletized articles have been markedly less than satisfactory.

SUMMARY OF THE INVENTION

The present invention, which provides a heretofore unavailable improvement over previous positioning and orienting devices for palletizers, comprises actuation of essentially identical means on the three sides of the palletized load other than the feed side. Upper positioning guides are pivotally mounted to, in the extended position, receive and position the articles initially conveyed onto the palletized load, be it onto the pallet or onto a separator sheet. With regard to a tier arrangement involving a substantial setback from the edge of the separator sheet, such positioning guides would, on three sides, define a perimeter smaller than that of the separator sheet. Accordingly, as the completed tier is lowered to the subsequent position, the guides would prevent positioning of the larger separator sheet on top of the completed tier. Thus, the instant invention provides for pivotable displacement or retraction of the positioning guides to accommodate placement of the separator sheets.

Adjustable recessed separator sheet locating means are provided an appropriate distance below the positioning guides to properly locate the separator sheet upon return of the positioning guides to the extended position. Further, articulated orientation guides are provided to accurately orient the lowered tier of articles. The orientation guides are articulatedly mounted to permit extension of the positioning guides when a pallet is positioned in the volume normally occupied by a lowered tier. A final and complete orientation of the articles from four sides is accomplished after positioning of the separator sheet and immediately before placement of another tier on the separator sheet. Thus, any disruption of the articles by the separator sheet is corrected and the weight of the newly-formed tier tends to lock and maintain the accurate orientation of the lower tier.

Accordingly, it is an object of the present invention to provide for article location and orientation in palletizers by concurrently bearing against and locating adjacent tiers of articles.

Another object of the present invention is to provide a new and improved method for locating and orienting articles on a palletized load which also accommodates separator sheets extending substantially beyond the edge of a tier of the articles.

Yet another object of the present invention is to provide a new and improved method for locating and orienting articles on a palletized load which bears upon at least one tier from four sides of the tier immediately prior to the imposition of a weight from above the tier.

Still another object of the present invention is to provide a new and improved method for locating and orienting articles in a palletized load which includes an articulated orientation guide to, alternatively, orient a lower tier of articles or, in the event such position is occupied by a pallet, to pivot from the normal orientation location without hindering the locating function of the locating guide on the feed portion of the apparatus.

Yet still another object of the present invention is to provide a method which accurately and automatically locates separator sheets utilized in palletized loads in which the edge of the tier is spaced back from the edge of the separator sheet.

These and other objects of the present invention will become apparent from the following description.

BRIEF DESCRIPTION OF THE DRAWINGS

In the drawings:

FIG. 1 is an elevation of a portion of the palletizing operating apparatus utilizing the method in accordance with the present invention;

FIG. 2 is a top view of a simplified device utilizing the concept of the present invention;

FIG. 3 is a modified sectioned side view along the plane of line 3—3 of FIG. 2 of a simplified palletizing operation wherein the pallet is positioned for initial support of articles thereon;

FIG. 4 is a modified sectioned side view along the plane of line 3—3 of FIG. 2 wherein the positioning and orienting guides are retracted to permit placement of a separator sheet;

FIG. 5 is a modified sectioned side view along the plane of line 3—3 of FIG. 2 wherein the orientation of the lowered tier and positioning of the separator sheet are illustrated;

FIG. 6 is a modified sectioned side view along the plane of line 3—3 of FIG. 2 wherein the positioning of newly fed articles by the positioning guide is illustrated; and FIG. 7 is a modified sectioned elevation along the plane of line 1—1 of FIG. 2 illustrating the feeding of new articles onto a separator sheet and, concurrently, illustrating the positioning of articles from the side from which the articles are fed.

DETAILED DESCRIPTION OF THE INVENTION

Turning now to the drawings, wherein like components are designated by like reference numerals throughout the various figures, a palletizing device for forming stacked tiers of articles is illustrated in a simplified manner in FIG. 1 and generally designated by the reference numeral 10. Palletizing device 10 comprises a conveyor 12 on which articles 13 are conveyed over support 15 to form tiers of articles 13 on separator sheet 16.

Adjacent tiers of articles 13 are supported on pallet 18 which, in turn, is supported by elevator 19. Articles conveyed to upper separator sheet 16 are, as shown in FIGS. 1 and 2, positioned by positioning guides 20. Positioning guides 20 are carried on support arm assemblies 22 which, in turn, are pivotally mounted at bearings 23 by means of shafts 24.

As illustrated in more detail in FIG. 2, shafts 24 are connected by right-angle drives 26 and mounted on three sides of the palletizer 10 in such a manner that activating device 27 concurrently pivots positioning guides 20 towards and away from the area which articles 13 are formed into tiers in a coordinated fashion through lever 28 attached through one of the right-angle drives 26.

The details of support arm assemblies 22, positioning guides 20 and the interaction therebetween are shown in more detail in FIG. 3. Upon initiation of the formation of articles 13 into tiers upon pallet 18, i.e., with elevator 19 in an uppermost position, it is necessary that the portion of support arm assemblies 22 below positioning guides 20 be articulated, such as by means of hinges 30. This permits positioning guides 20 to accurately receive and position articles 13 into initial tier upon pallet 18. The lower portion of support arm assemblies 22 are articulated to accommodate the unusual event of pallet 18 occupying the position normally occupied by a second tier of articles 13. While the weight of the lower portion of support arm assemblies 22 usually suffices to bias the articulated portion thereof to the proper position in a noninterfering situation, springs (not shown) or other means may be employed to enhance the bias.

The function of the means supported on the lower portion of support arm assemblies 22 is illustrated in FIG. 4 whereat adjustable separator sheet locating means 32 and orienting guides 34 are shown, with locating guides 20 pivoted into a retracted or open position to permit insertion of separator sheet 16 onto the lowered tier of articles 13, as shown. Precise lateral placement of separator sheet 16 is not necessary. Rather, adjustable separator sheet locating means 32, as shown in FIG. 5, accurately position and locate separator sheet 16 on the lowered tier of articles 13 upon movement of support arm assemblies 22 and, accordingly, locating guides 20, separator sheet locating means 32 and orienting guide 34, into the extended or article positioning orientation.

With locating arm assemblies 22 in the extended, as opposed to retracted, position, locating guides 20 are in a proper relationship to receive and locate articles 13 being fed therein. Separator sheet 16 is accurately located and articles 13 in the lower tier are oriented by orienting guides 34 after the disruptive act of inserting and positioning separator sheet 16 and lowering of the tiers. Thus, orientation of articles 13 in the lower tier is accomplished and articles 13 of the upper tier are immediately fed onto separator sheet 16 to secure and maintain the orientation of the lower tier of articles 13.

Though the discussion has been primarily with regard to traverse location, as in FIGS. 5 and 6, it is to be noted that the lower tier of articles 13 is oriented from four sides, as shown in FIG. 7. Orientation member 36 is movably supported by pivot 37 below support 15 and is activatable by cylinder 38 concurrently with the extension of arm support assemblies 22 by, for instance, a common pneumatic pressure source. Since orientation member 36 services a single orientation function, as opposed to the plurality of functions performed by support arm assemblies 22 and associated guides 20 and 34, interference by pallet 19, as shown in FIG. 3, is not troublesome. By merely regulating the force applied to orientation member 36, it may bear upon an obstruction without affecting other functions. Since there is no need for orientation when pallet 19 is being directly loaded, the fact that orientation member 36 does not fully extend is of no consequence.

Summarily, the method of the present invention provides a number of advantages not obtainable with conventional palletizing apparatus. For instance, in a preferred embodiment, the present invention permits final squaring and orientation of a tier of articles after the steps of lowering the tier and placement of a separator sheet. Further, the orientation occurs immediately prior to imposition of the weight of another tier of articles which weight tends to lock and maintain the oriented tier in place.

Also, though the initial positioning and final orientation of the articles occurs in an area which may have a perimeter substantially less than that of the pallet or separator sheet, the areas are cleared for lowering of the tiers and convenient placement of separator sheet. In a particularly preferred embodiment, the separator sheet not only can be conveniently placed, but it is automatically properly located after placement.

While only one particularly useful and detailed embodiment of the invention has been described and illustrated, it is expected that those skilled in the art will recognize various changes and modifications to the described and illustrated embodiment, and that such changes may be utilized without exceeding the scope of the invention as defined by the following claims.

What is claimed is:

1. A method of palletizing articles in vertically spaced tiers with a separator sheet between each tier comprising:

conveying a plurality of articles onto a support surface and into contact with article positioning guide members located adjacent three edges of the support surface to form a tier of such articles, retracting the positioning guide members upon completion of formation of the tier of articles, lowering the tier of articles a distance substantially equal to the height of the articles, placing a separator sheet on the upper surface of the tier of articles to form a support surface, concurrently extending separator sheet locating surfaces and orientation guide members connected to said separator sheet locating surfaces to locate the separator sheet and orient and square the lower tier, repositioning the positioning guide members, and conveying additional articles onto the separator sheet to bear upon and lock the oriented articles in the lower tier in position.

2. A method of palletizing articles as set forth in claim 1 wherein the initial support surface is a pallet and the separator sheet locating means and orientation guide members are displaced by the pallet through articulated support portions to enable the article positioning guide means to be properly positioned above the pallet to form an initial tier of articles on the pallet.

3. A method of palletizing articles onto support surfaces wherein the articles are formed into tiers on the support surfaces, comprising: conveying a plurality of articles onto a support surface and into contact with article positioning guide members located in a position adjacent the edge of the support surface to form a tier of such articles, retracting the positioning guide members upon completion of formation of the tiers of articles, lowering the tier of articles a distance substantially equal to the height of the articles, placing a separator sheet on the upper surface of the tier of articles to form a support surface, extending the article positioning guide members from three sides and concurrently extending separator sheet locating surfaces connected to the article positioning guide members to locate the separator sheet, conveying additional articles onto the separator sheet and into contact with the article positioning guide members to form yet another tier of articles.

4. A method as set forth in claim 3 wherein the lowered tier of articles is oriented after placement of the separator sheet by bringing to bear upon the edge thereof retractable article orientation guide members suspended from common supports with the article positioning guide members and separator sheet locating surfaces and, from a fourth side, bringing to bear an article orientation member, the article orientation member being retractable with the article positioning guide to facilitate lowering of the tier of articles and clearance of protruding separator sheets.

* * * * *